April 20, 1954  W. R. BONHAM  2,675,899
TEMPERATURE CONTROLLED CLUTCH
Filed April 3, 1950
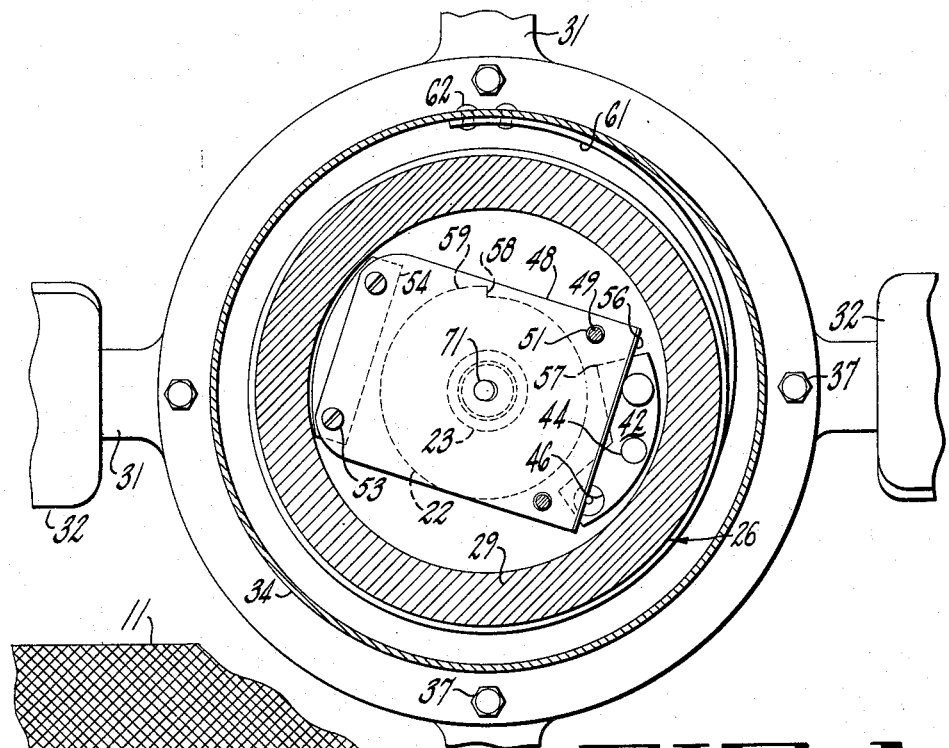
FIG_1_
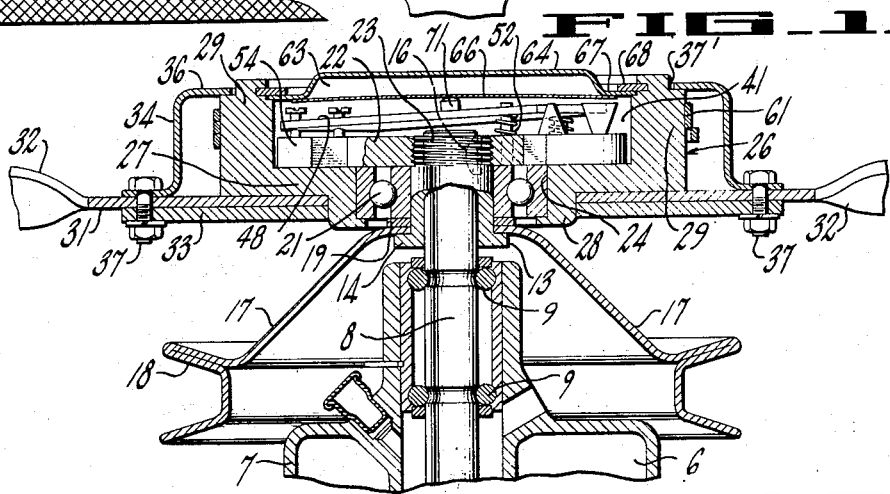
FIG_3_  FIG_2_
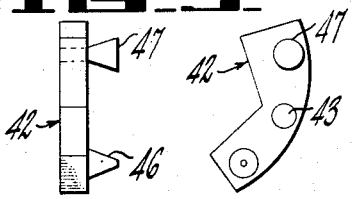
FIG_4_
INVENTOR.
Walter R. Bonham
BY
ATTORNEY Patented Apr. 20, 1954

2,675,899

UNITED STATES PATENT OFFICE 2,675,899

TEMPERATURE CONTROLLED CLUTCH

Walter R. Bonham, Palo Alto, Calif.

Application April 3, 1950, Serial No. 153,673

1 Claim. (Cl. 192—48)

My invention relates primarily to automotive equipment and is especially concerned with a self-contained cooling fan mechanically driven from the engine being cooled and automatically driven or free under control of a thermostat responsive to temperature conditions in the vicinity of the engine cooling radiator and in response to selected temperature values.

In automobile or similar power plants having a radiator and a mechanically driven cooling fan it is well known to be advantageous to have some means for operating the fan periodically rather than continuously and in accordance with some temperature condition, for example, the temperature of the cooling water. Devices of this nature are often somewhat complex and usually are rather delicate. In a moderate size automobile power plant, the fan utilizes two or three horse power and to place it in operation and to exclude it from operation while the engine is running at a moderately high speed; for example, 4000 revolutions per minute, requires a rugged mechanism. On the other hand, the temperature at which the fan should be operating is not far different in many cases from the temperature at which the fan should not be operating. A fan on a piece of automotive equipment is not only subject to all of the ambient temperatures to which the equipment is subject, but likewise is often operated in dusty and debris-laden air, is sometimes subject to spilled water, lubricants and the like, is mechanically abused and is generally given rough treatment. Furthermore, if such a device is to be installed upon an engine already constructed, it is difficult to produce a satisfactory overall result.

It is therefore an object of my invention to provide an improved temperature responsive fan.

Another object of my invention is to provide a temperature responsive fan that is substantially self-contained and is easy to install.

A still further object of my invention is to provide a temperature responsive fan in which the working parts are substantially enclosed and protected.

A still further object of my invention is to provide a temperature responsive fan capable of cutting into and out of operation under full load and full speed conditions without any harmful effects upon the fan and without impairing its long life.

A still further object of the invention is to provide a temperature responsive fan which can readily be installed in power plants already in existence.

A still further object of the invention is to provide a temperature responsive fan which is quickly responsive to rather small variations in the controlling temperature.

Other objects, together with the foregoing, are attained in the form of the invention described in the accompanying description and illustrated in the accompanying drawings in which Figure 1 is a cross section on a vertical transverse plane of a temperature responsive fan constructed in accordance with my invention.

Figure 2 is a cross section on a longitudinal, diametrical plane through the temperature responsive fan of my invention.

Figure 3 is a side elevation of a pawl utilized in my fan.

Figure 4 is a front elevation of a pawl.

While the temperature responsive fan of my invention is capable of use in many different environments and under various conditions and can be embodied in a number of variant forms depending upon different engineering factors, it has successfully been embodied and utilized in the form shown herein, especially in connection with an automobile power plant.

In this form of the invention, the fan is installed in its customary position with respect to an engine, not shown, which is, however, provided with the customary water pump 6. This is usually situated at the forward end of the engine block and includes a housing 7 in which a shaft 8 is mounted by bearings 9. The location of the water pump 6 is close to and is usually spaced slightly behind a radiator core 11 connected in circuit with the cooling system of the engine including the pump 6. The radiator core is subject to air currents due to vehicle motion and to fan operation.

In accordance with my invention, I provide on the drive shaft 8 a sleeve 13 having a flange 14 at the rearward end thereof and held for rotation with the shaft by a key 16 and any suitable locking device such as a cotter pin, not shown. Mounted on the sleeve 13 in abutment with the flange 14 is a driving pulley 17 of the customary kind, having a peripheral V-groove 18 to engage a driving V-belt, not shown. During operation of the engine the pulley 18 is revolved and so is the shaft 8, the connection between the pulley and the sleeve being a driving inter-engagement.

Against a spacer 19 on the sleeve 13 is disposed an anti-friction bearing 21, preferably a ball bearing, held in place against the remaining structure by a nut in the form of a single-toothed ratchet 22, the threaded inter-connection 23 between the nut and the sleeve 13 being opposite to the normal direction of rotation of the shaft 8. The outer part of the anti-friction bearing 21 is received in a recess 24 formed in a drum 26. The drum includes a disc 27 having a smaller peripheral flange 28 and a larger peripheral flange 29. Encompassing the smaller flange 28 and in abutment with one side of the disc 27 is the centrally apertured disc-like hub 31 of a cooling or air circulating fan 32 having a number of blades in the customary fashion. A backing plate 33 is disposed alongside the hub 31 to afford additional stiffness since the normal direction of rotation of the fan tends to move it toward the disc 27. The fan is likewise axially confined and rotatably mounted with respect to the drum 26 by a closure cup 34 overlying the periphery of the drum and having an inturned portion 36 engaging a small groove 37 in the outer forward corner of the drum. The closure 34 and the backing plate 33 are both held assembled to the fan hub 31 by suitable fastenings 37 disposed at appropriate intervals.

Within the enclosure 41 of the drum is a pawl 42. This conveniently is a strip of metal between its ends provided with an aperture 43 to receive a pin 44 extending from the disc 27 so that the pawl is pivotally mounted with respect to and on the drum. The pawl adjacent one end is provided with an upstanding cone 46 and adjacent its other end is provided with an inverted cone 47, the surfaces of the two cones being approximately complementary.

Disposed within the enclosure 41 and overlying the end of the drive shaft 8 is an actuating lever 48 in the shape of a plate, preferably of metal, having a pair of apertures 49 therein loosely guided on a pair of pins 51 upstanding from the disc 27 within the enclosure. The lever 48 is urged away from the disc by a pair of coil springs 52. The other end of the lever 48 is similarly provided with apertures encompassing a pair of removable shoulder screws 53 engaging the disc 27 through an interposed spacer 54. Since the screws 53 have heads larger than the apertures in the lever 48, the lever is freely confined and loosely restrained by them and by the pins 51.

The edge 56 of the lever engages the surfaces of the cones 46 and 47. As the lever 48 in effect pivots about the spacer 54 as a fulcrum, or as its edge 56 moves approximately axially, it rubs against the cones 46 and 47 and since such cones are inverse, positively rotates the pawl 42 one way or the other about the pivot pin 44. In one position of the pawl, as shown in Figure 1, it is entirely out of the path of the ratchet 22. In another extreme position of the pawl, its forward corner 57 is projected into the path of a radial shoulder 58 interrupting the spiral periphery 59 of the ratchet 22.

In this fashion, when the lever 48 is moved to and fro, it causes a corresponding oscillation of the pawl 42 and abruptly engages or disengages the pawl from the ratchet 22. There is thus provided either a positive disconnection or a positive coupling between the driving member 13 and the intermediate drum 27. This abrupt clutching or declutching arrangement is capable, when engaged, of positively transmitting virtually unlimited torque and the engagement takes place well within one revolution of the driving shaft so that the engagement is relatively quite abrupt. The disconnection is equally positive, complete and abrupt.

Because of the sudden engagement of the clutch formed by the pawl and ratchet and partly also because of the unlimited (within the strength of the apparatus) amount of torque that the pawl and ratchet transmit, I provide a yielding driving connection between the drum or intermediate member and the fan itself. For that reason I attach to the interior of the housing 34 a helical clutch spring 61. One end of such spring is affixed by rivets 62, for example. One or a series of turns of the clutch spring are made in the proper direction around the second peripheral flange 29 of the drum. Since part of one or more of the turns of the clutch spring are in frictional engagement with the drum, when the drum is quickly accelerated the spring turns are wound tighter and tighter on the drum and after some initial yielding and slipping finally provide a clutching engagement to turn the fan in unison with the drum.

The frictional or yielding inter-engagement between the driver 13 and the drum is such that only a set or pre-determined maximum torque can be transmitted. During initial acceleration, the spring yields a few degrees or the clutch slips for a few turns, or both, until the fan and the drum come up exactly to the same speed. In this way, a cushioned or yielding driving connection is provided for the fan and the jolt or abrupt engagement of the pawl and ratchet are effective only on the light drum mechanism and not upon the relatively massive fan.

In order to make the fan temperature responsive, I dispose a bellows or wafer type thermostat 63 on the forward face of the drum to form a part of the drum enclosure. This is a virtually standard disc or snap acting thermostat having a relatively heavy offset housing 64 closed by a thinner actuating disc 66 joined in a peripheral flange 67. This is utilized as a mounting by being placed within the recessed entrance to the drum and is retained by a removable snap ring 68. The mounting determines the amount of heat transferred to and from the thermostat by direct metal conduction. The thermostat as so mounted is immediately in the stream of air passing through the radiator core 11 under the influence of the fan 32 or under the influence of the vehicle when it is moving. The temperature of the thermostat itself is responsive largely to the temperature of the air passing over it but in addition is affected by direct thermal radiation from the core 11.

As the thermostat temperature varies, the disc 66 moves. A button 71 transmits motion from the thermostat disc 66 to the lever 48, and so actuates the clutch to engage or to disengage.

What is claimed is:

In a temperature responsive device, a driving member including a shaft and a ratchet mounted thereon, an intermediate member rotatably mounted on said shaft and comprised of a drum with a centrally pivoted pawl mounted thereon to engage and disengage said ratchet, a pair of cones disposed on each arm of said pawl and mounted with their axis perpendicular thereto, said cones being oppositely directed with respect to each other, a plate at one edge hinged to said drum and at the other edge in engagement with the sloping sides of said cones, reciprocably acting temperature responsive means mounted on said drum to transmit motion to said plate, spring means between said drum and said plate for maintaining contact between said temperature responsive means and said plate, and a driven member frictionally engaged with said intermediate member.

References Cited in the file of this patent

UNITED STATES PATENTS

| Number | Name | Date |
| --- | --- | --- |
| 1,233,518 | Snyder | July 17, 1917 |
| 1,235,940 | Shipman | Aug. 7, 1917 |
| 2,005,468 | Modine | June 18, 1935 |
| 2,169,121 | Coy | Aug. 8, 1939 |
| 2,214,391 | Weydell | Sept. 10, 1940 |
| 2,381,567 | Bonham | Aug. 7, 1945 |
| 2,516,269 | Starkey | July 25, 1950 |
| 2,570,515 | Bonham | Oct. 9, 1951 |